(12) United States Patent
Chen et al.

(10) Patent No.: US 10,600,206 B2
(45) Date of Patent: Mar. 24, 2020

(54) TRACKING SYSTEM AND METHOD THEREOF

(71) Applicant: HTC Corporation, Taoyuan (TW)

(72) Inventors: Yuan-Tung Chen, Taoyuan (TW); Shing-Chiao Yeh, Taoyuan (TW); Po-I Wu, Taoyuan (TW); Heng Ding, Taoyuan (TW); Kun-Chun Tsai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 113 days.

(21) Appl. No.: 15/965,997

(22) Filed: Apr. 30, 2018

(65) Prior Publication Data

US 2018/0315211 A1 Nov. 1, 2018

Related U.S. Application Data

(60) Provisional application No. 62/491,269, filed on Apr. 28, 2017, provisional application No. 62/491,268, filed on Apr. 28, 2017.

(51) Int. Cl.
*G06K 9/00* (2006.01)
*G06T 7/73* (2017.01)
(Continued)

(52) U.S. Cl.
CPC .............. *G06T 7/74* (2017.01); *G01C 21/20* (2013.01); *G01S 5/009* (2013.01); *G01S 5/0072* (2013.01);
(Continued)

(58) Field of Classification Search
CPC .. G06T 7/74; G06T 7/579; G06T 7/75; G06T 7/251; G06T 2207/10028;
(Continued)

(56) References Cited

U.S. PATENT DOCUMENTS 8,531,519 B1  9/2013 Peng et al.
9,497,443 B1 * 11/2016 Sundheimer .............. G06T 7/73
(Continued)

OTHER PUBLICATIONS

Chao X. Guo et al., "Large-scale cooperative 3D visual-inertial mapping in a Manhattan world", 2016 IEEE International Conference on Robotics and Automation (ICRA), May 16, 2016, pp. 1071-1078.
(Continued)

*Primary Examiner* — Shefali D Goradia
(74) *Attorney, Agent, or Firm* — CKC & Partners Co., LLC (57) ABSTRACT

A tracking system and a method thereof are provided in this disclosure. The tracking method includes steps of: capturing first images of the physical environment by a first electronic device; extracting a plurality of first feature points from the first images; generating a plurality of map points according to the extracted first feature points; building a map of the physical environment according to the map points by the first electronic device; capturing a second image of the physical environment by a second electronic device; extracting second feature points of the second image and transmitting the second feature points to the first electronic device; and estimating a pose of the second electronic device according to the map and the received second feature points by the first electronic device.

18 Claims, 12 Drawing Sheets

(51) Int. Cl.
  *G01S 5/00* (2006.01)
  *G01C 21/20* (2006.01)
  *G06T 7/579* (2017.01)
  *G01S 5/16* (2006.01)
  *G06K 9/46* (2006.01)
  *G06T 7/246* (2017.01)
  *G06K 9/62* (2006.01)

(52) U.S. Cl.
  CPC .................. *G01S 5/16* (2013.01); *G06K 9/00* (2013.01); *G06K 9/00979* (2013.01); *G06K 9/4604* (2013.01); *G06K 9/6211* (2013.01); *G06T 7/251* (2017.01); *G06T 7/579* (2017.01); *G06T 7/75* (2017.01); *G06T 2207/10028* (2013.01); *G06T 2207/30244* (2013.01)

(58) Field of Classification Search
  CPC .......... G06T 2207/30244; G01C 21/20; G01S 5/0072; G01S 5/009; G01S 5/16; G06K 9/00; G06K 9/00979; G06K 9/4604; G06K 9/6211
  See application file for complete search history.

(56) References Cited

U.S. PATENT DOCUMENTS

| | | | |
|---|---|---|---|
| 10,290,090 B2* | 5/2019 | Chang | G06T 7/0008 |
| 2016/0260250 A1* | 9/2016 | Jovanovic | G06T 7/564 |
| 2016/0364867 A1* | 12/2016 | Moteki | G06T 7/73 |

OTHER PUBLICATIONS

Corresponding European search report dated Sep. 18, 2018.

* cited by examiner

TRACKING SYSTEM AND METHOD THEREOF

CROSS-REFERENCE TO RELATED APPLICATION

This application claims priority to U.S. Provisional Application Ser. No. 62/491,269, filed on Apr. 28, 2017, which is herein incorporated by reference. This application claims priority to U.S. Provisional Application Ser. No. 62/491,268, filed on Apr. 28, 2017, which is herein incorporated by reference.

BACKGROUND

Field of Invention

The disclosure relates to a tracking system and a method thereof. More particularly, the disclosure relates to how to locate a device by means of another powerful device with a map and refine the map in the tracking system.

Description of Related Art

Simultaneous Localization and Mapping (SLAM) technology is utilized by an electronic device to construct the map of an unknown environment (e.g., the physical environment) while simultaneously track its own position by means of the constructed map within the unknown environment. However, the electronic device needs a lot of computation resource s to implement the SLAM technology. Thus, if the electronic device has not enough computation resources, it will not be able to utilize the SLAM technology to track its own position.

SUMMARY

The disclosure provides a tracking system including a first electronic device and a second electronic device. The first electronic device is located in a physical environment. The first electronic device includes a first camera unit, a first processor and a first communication unit. The first processor is electrically coupled to the first camera unit and the first communication unit. The first camera unit is configured for capturing a plurality of first images of the physical environment. The first processor is configured for extracting a plurality of first feature points from the first images, generating a plurality of map points according to the extracted first feature points, and building a map of the physical environment according to the map points. The second electronic device is located in a physical environment. The second electronic device includes a second camera unit, a second processor and, a second communication unit. The second processor is electrically coupled to the second camera unit and the second communication unit. The second camera unit is configured for capturing a second image of the physical environment. The second processor is configured for extracting a plurality of second feature points from the second image. The second communication unit is configured for transmitting the second feature points to the first electronic device; wherein the first communication unit is configured for receiving the second feature points, and the first processor is further configured for estimating a pose of the second electronic device according to the map and the received second feature points. The pose of the second electronic device comprises at least one of a position of the second electronic device and an orientation of the second electronic device.

The disclosure also provides a tracking method. The tracking method includes following operations of: capturing a plurality of first images of a physical environment by a first electronic device; extracting a plurality of first feature points from the first images, generating a plurality of map points according to the extracted first feature points, and building a map of the physical environment according to the map points by the first electronic device; capturing a second image of the physical environment by a second electronic device; extracting a plurality of second feature points from the second image and transmitting the second feature points to the first electronic device by the second electronic device; receiving the second feature points and estimating a pose of the second electronic device according to the map and the received second feature points by the first electronic device. The pose of the second electronic device comprises at least one of a position of the second electronic device and an orientation of the second electronic device.

The disclosure also provides a tracking system including a first electronic device and a second electronic device. The first electronic device is located in a physical environment. The first electronic device includes a first camera unit, a first processor and a first communication unit. The first processor is electrically coupled to the first camera unit and the first communication unit. The first camera unit is configured for capturing a plurality of first images of the physical environment. The first processor is configured for extracting a plurality of first feature points from the first images, generating a plurality of map points according to the extracted first feature points, and building a map of the physical environment according to the map points. The second electronic device is located in a physical environment. The second electronic device includes a second camera unit, a second processor and a second communication unit. The second processor is electrically coupled to the second camera unit and the second communication unit. The second camera unit is configured for capturing a second image of the physical environment. The second processor is configured for extracting a plurality of second feature points from the second image. The second communication unit is configured for transmitting the second feature points to the first electronic device; wherein the first communication unit is further configured for comparing the second feature points with the map points so as to determine whether there is a match therebetween and updating the map according to the comparison result.

Based on aforesaid embodiments, the first electronic device in the tracking system is capable of calculating a position of the second electronic device, establishing a map according to the first feature points collected by the first electronic device and the second feature points collected by the second electronic device. In some embodiments, the second electronic device is configured to collect the second feature points in the physical environment, and the second electronic device is able to provide the second feature points to refine the map established by the first electronic device. The second electronic device can locate its position according to the map established by the first electronic device. Therefore, the second electronic device is not necessary to have a powerful computation resource to establish the map by itself. Therefore, the tracking system allows a device with poor computation resource locating its position using the SLAM technology.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
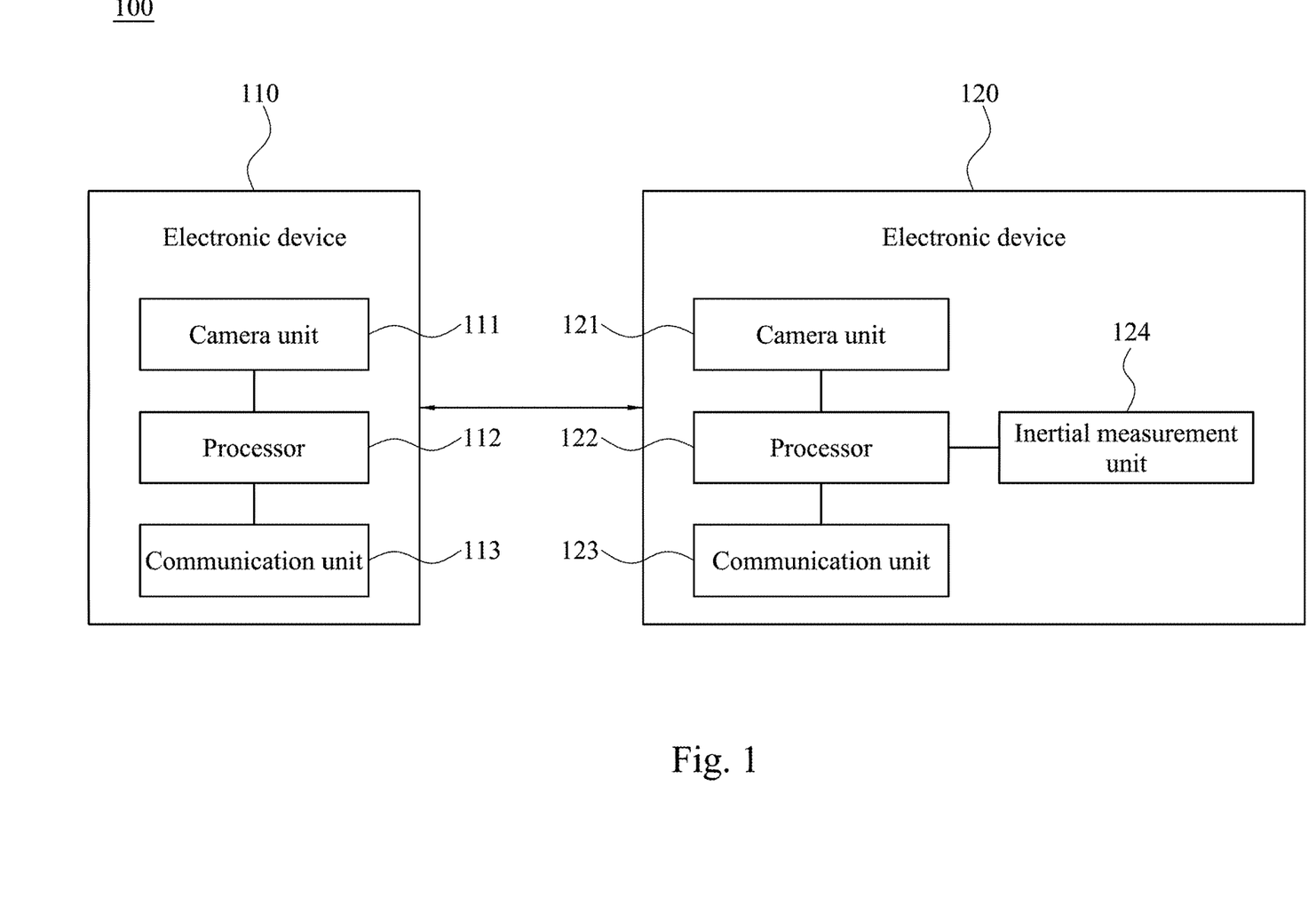
FIG. 1 is a functional block diagram illustrating a tracking system according to an embodiment of this disclosure.

Reference is made to FIG. 1, which is a functional block diagram illustrating a tracking system 100 according to an embodiment of this disclosure. As shown in FIG. 1, the tracking system 100 includes electronic devices 110 and 120. The electronic devices 110 and 120 are located in a physical environment. In some embodiments, the electronic device 110 can be implemented by a head-mounted device (HMD). The electronic device 120 can be implemented by a controller device, a smart phone or a head-mounted device communicated with the electronic device 110. In some embodiments, the electronic device 120 may be equipped with less computation resource (e.g., a processing unit with a lower operation frequency limited memory, etc.) than the electronic device 110.

The electronic device 110 includes a camera unit 111, a processor 112 and a communication unit 113. The processor 112 is electrically connected to the camera unit 111 and the communication unit 113. The electronic device 120 includes a camera unit 121, a processor 122, a communication unit 123 and an inertial measurement unit (IMU) 124. The processor 122 is electrically connected to the camera unit 121, the communication unit 123 and the IMU 124. The processor 112 and 122 can be implemented by a graphics processor, a central processing unit (CPU), a control circuit and/or a graphics processing unit. In some embodiments, the camera unit 111 can include one camera component located at the front side of the head-mounted device, and the camera unit 121 can include one camera component located on the controller device, the smart phone or the head-mounted device. In some embodiments, the camera units 111 and 121 can include a dual camera module and/or a depth camera. In some embodiments, the communication units 113 and 123 can include a WiFi transceiver, a WiFi-Direct transceiver, a Bluetooth transceiver, a BLE transceiver, a Zigbee transceiver and/or any applicable wireless communication transceiver.

Figure 2:
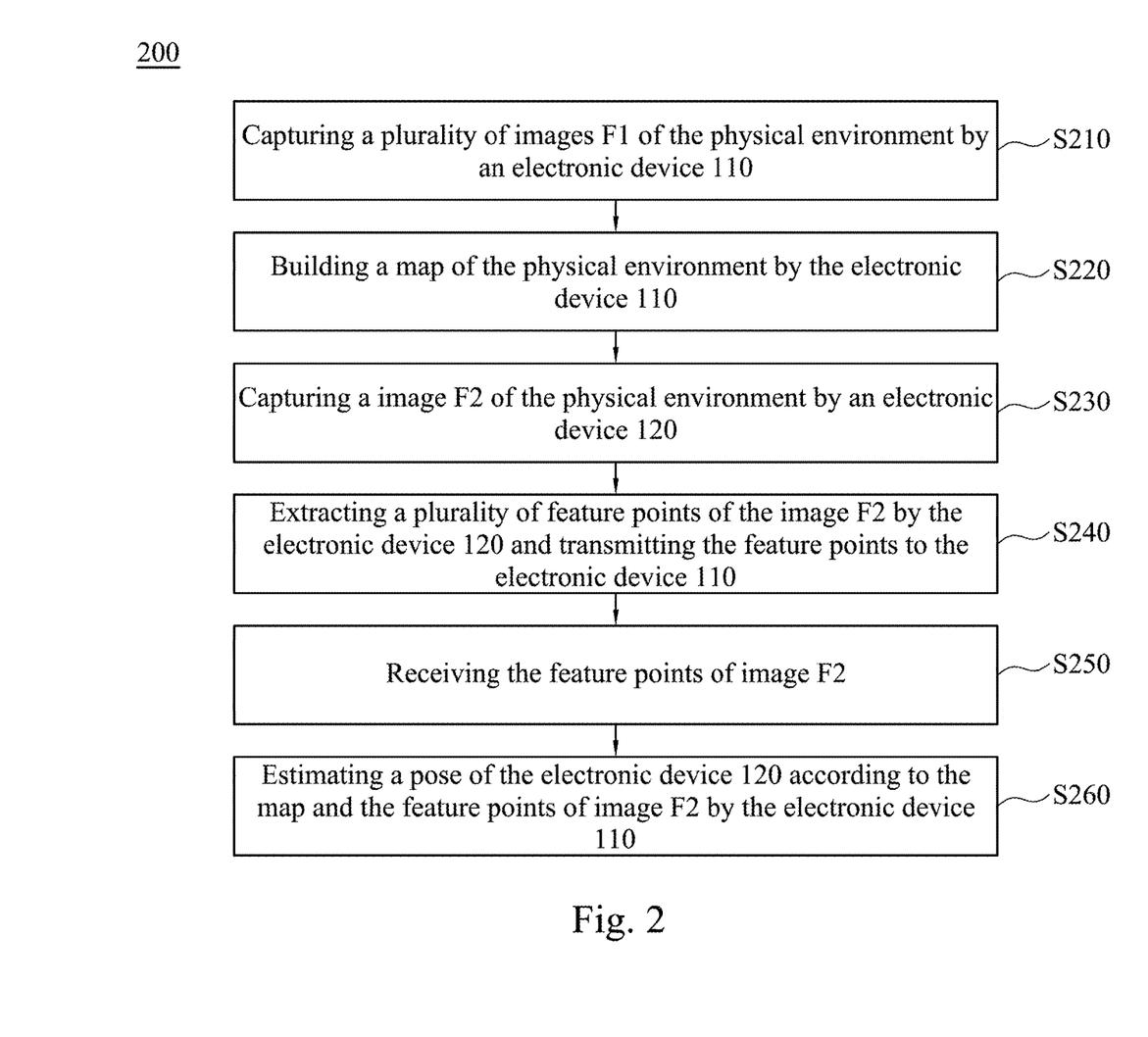
FIG. 2 is a flow diagram illustrating a tracking method according to an embodiment of this disclosure.

Reference is made to FIG. 2, which is a flow diagram illustrating a tracking method 200 according to an embodiment of this disclosure. In the embodiment, the tracking method 200 can be utilized to build a three dimensional map of the physical environment, and calculate or estimate the pose of the electronic devices 110 and 120. In this disclosure, the poses of the electronic devices 110 and 120 comprise the positions of the electronic devices 110 and 120 or the orientations of the electronic devices 110 and 120 or both.

Figure 3:
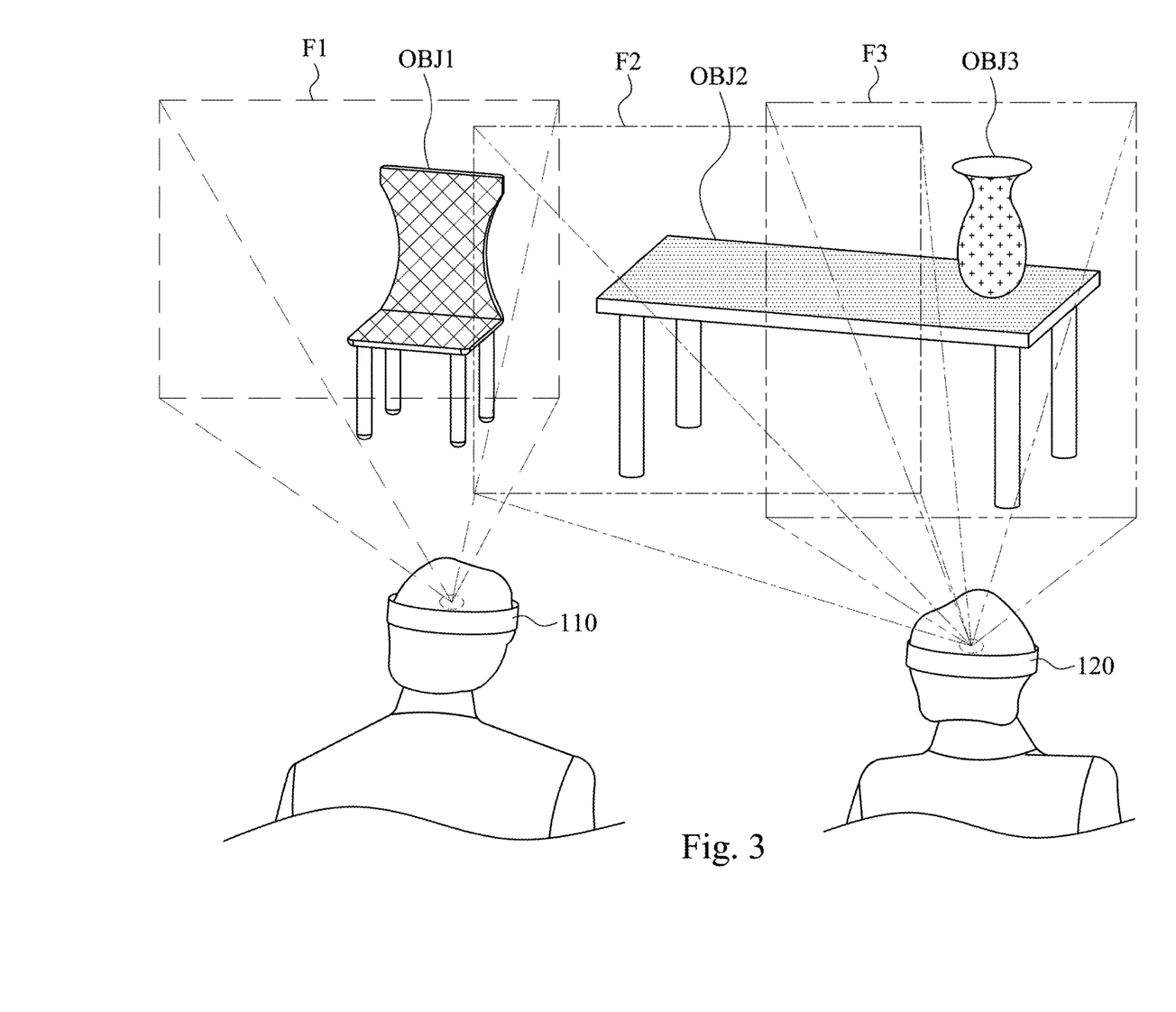
FIG. 3 is a schematic diagram illustrating views of the electronic devices in the physical environment.

Reference is made to FIG. 1 and FIG. 2. As the embodiment shown in FIG. 2, the tracking method 200 firstly executes step S210 to capture a plurality of images F1 of the physical environment over time by the electronic device 110. Reference is made to FIG. 3, which is a schematic diagram illustrating views of the electronic devices 110 and 120 in the physical environment. As the example shown in FIG. 3, the camera unit 111 of the electronic device 110 is configured to capture images F1 of the physical environment over time. The images F1 can be captured from different camera poses, and only one image is shown in FIG. 3 for simplicity.

Figure 4A:
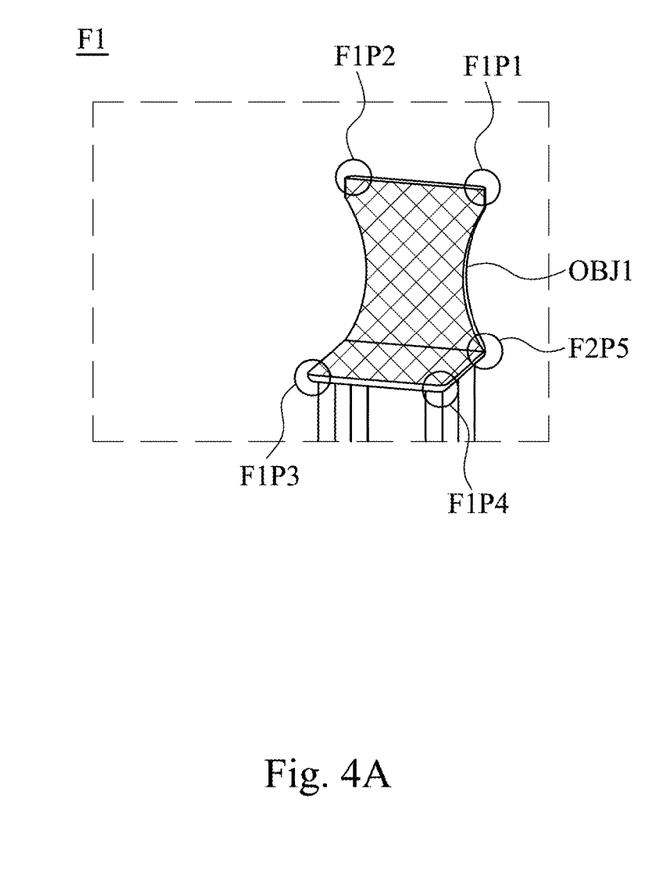
FIG. 4A is a schematic diagram illustrating the feature points of the images.

Afterward, the tracking method 200 executes step S220 to build a map of the physical environment by the electronic device 110. Before building the map, the processor 112 is configured to extract the feature points from the images F1. Reference is made to FIG. 4A, which is a schematic diagram illustrating the feature points of the images F1 (only one image is shown therein for simplicity). In aforesaid embodiment, the processor 112 is configured to extract the feature points F1P1, F1P2, F1P3, F1P4 and F1P5 of the object OBJ1 according to the images F1 captured by the camera unit 111. The feature points F1P1, F1P2, F1P3, F1P4 and F1P5 include descriptors and two dimensional (2D) coordinates of the feature points F1P1, F1P2, F1P3, F1P4 and F1P5 within the image F1. In general, the descriptor of a feature point may indicate features such as a corner, a blob, an edge, a line, a texture, a color, etc. In the embodiment, if the object OBJ1 has a net texture with green color, the feature points F1P1, F1P2, F1P3, F1P4 and F1P5 extracted from the image F1 also have the descriptors of the net texture and green color. In another embodiment, the feature points are also called landmarks.

Figure 4B:
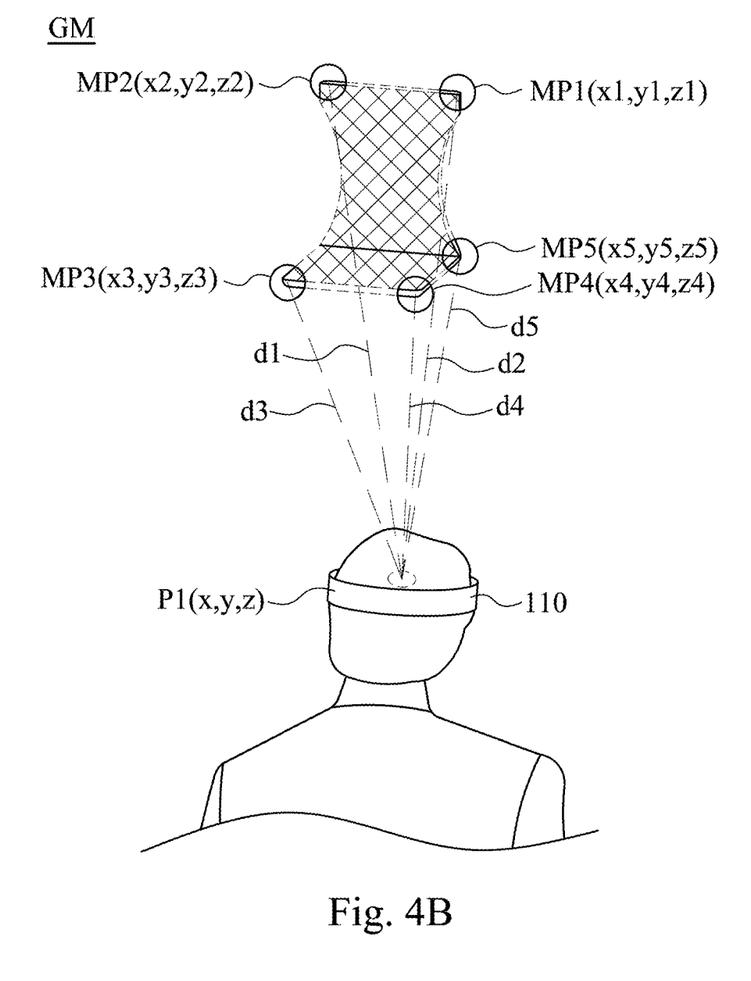
FIG. 4B is a schematic diagram illustrating the map points in the map.

Reference is made to FIG. 4B, which is a schematic diagram illustrating the map points in the map GM. In aforesaid embodiment, the feature points F1P1, F1P2, F1P3, F1P4 and F1P5 are extracted by the processor 112, and the processor 112 is configured to create the map points MP1, MP2, MP3, MP4 and MP5 according to the feature points F1P1, F1P2, F1P3, F1P4 and F1P5 and add the map points MP1, MP2, MP3, MP4 and MP5 to the map GM. In some embodiments, the map points MP1, MP2, MP3, MP4 and MP5 have data of the feature points F1P1, F1P2, F1P3, F1P4 and F1P5 (e.g. descriptors and 2D coordinates) and three dimensional (3D) coordinates. Here the descriptor of the feature point is also a descriptor of the corresponding map point indicating the feature(s) thereof. As shown in FIG. 4B, the 3D coordinates of the electronic device 110 is represented as P1(x, y, z), which at a certain time point (e.g. when the electronic device 110 powers on) can be set as an origin (0, 0, 0) of a coordinate system of the map (i.e. x=y=z=0). Relative to the origin, the coordinates of the map point MP1 are (x1, y1, z1), the coordinates of the map point MP2 are (x2, y2, z2), the coordinates of the map point MP3 are (x3, y3, z3), the coordinates of the map point MP4 are (x4, y4, z4), and the coordinates of the map point MP5 are (x5, y5, z5). Take the map point MP1 for example to describe how to determine its coordinates (x1,y1,z1). It is assumed that the image F1 is captured when the electronic device 110 is at the origin. The values of x1 and y1 can be generated according to the 2D coordinates of the feature point F1P1. Details of the generation method are well-known and will not be described here. Further, the value of z1 can be derived from the distance d1 between the map point MP1 and the electronic device 110, for example z1 may be equal to d1. Therefore the values of x1, y1 and z1 are determined. In similar manner, the 3D coordinates of the map points MP2, MP3, MP4 and MP5 can also be determined. In an embodiment, the distances d1, d2, d3, d4 and d5 may be obtained via a depth camera included in the camera unit 111 (not shown in figures). For example, when the camera unit 111 captures the image F1, the depth camera can simultaneously capture an image for providing depth information of the feature points F1P1-F1P5, which can then be used to estimate the distances d1-d5. In another embodiment, the distances d1, d2, d3, d4 and d5 may be calculated by the disparity. In this case, the disparity can be calculated based on displacement (e.g. the horizontal displacement) of the camera unit 111 in different time points. For example, in a time point, the camera unit 111 captures an image of X object and Y object, and in another time point, the camera unit 111 moves to another position (e.g. horizontal movement) and captures another image of X object and Y object again. There are a first difference between two images of X object and a second difference between two images of Y object. If X object is closer to the camera unit 111 than Y object, then the first difference is larger than the second difference. Therefore, the distance between the camera unit 111 and X object and the distance between the camera unit 111 and Y object can be calculated. Thus, if X object comprises F1P1 and Y object comprises F1P2, the distances d1 and d2 can be calculated. The distances d3, d4 and d5 can also be calculated in such manner. In some embodiments, if the image F1 is captured when the electronic device 110 is at another pose (i.e. another position and/or orientation) rather than the origin, then the 3D coordinates determined in above ways (i.e. depth camera or disparity) should be transformed so that they can be used as the 3D coordinates of the map points. This transformation reflects the movement from the origin to another pose, and will not be detailed here since it is a well-known technique.

Figure 5A:
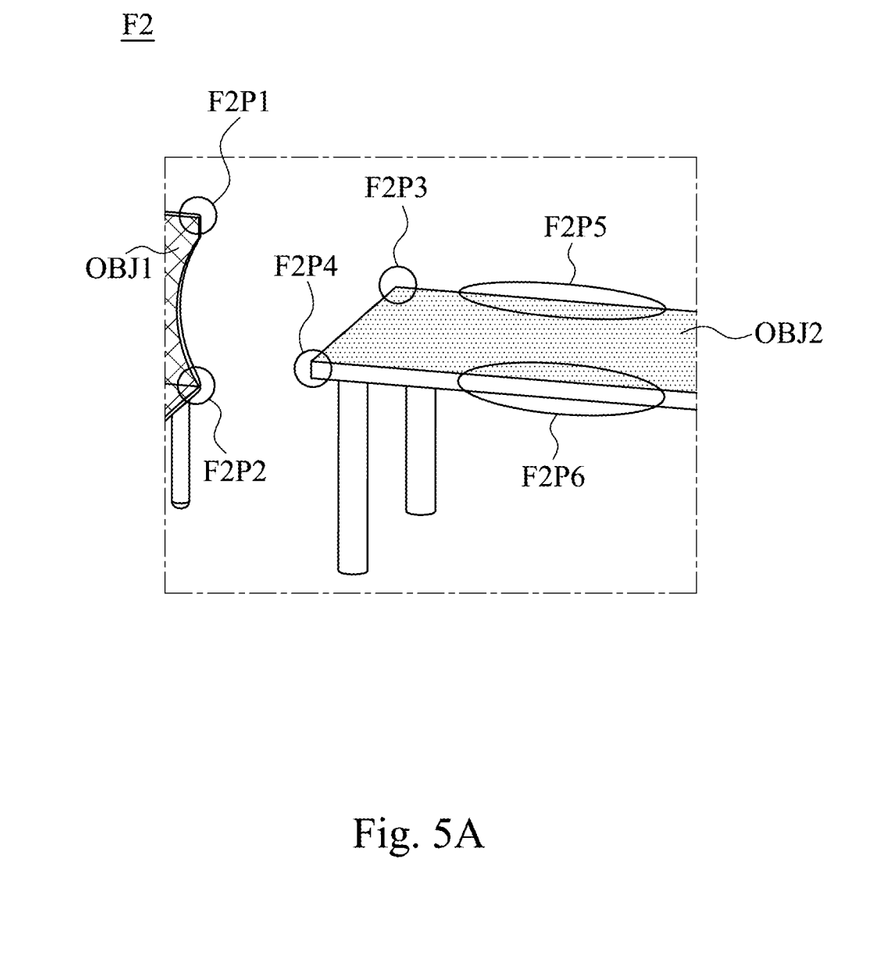
FIG. 5A is a schematic diagram illustrating the feature points of the images.

Afterward, the tracking method 200 executes step S230 and S240 to capture an image F2 of the physical environment by the electronic device 120, extract a plurality of feature points of the image F2 by the electronic device 120 and transmit the extracted feature points to the electronic device 110. Reference is made to FIG. 5A, which is a schematic diagram illustrating the feature points of the image F2. As shown in FIG. 5A, the processor 122 is configured to extract the feature points F2P1 and F2P2 of the object OBJ1 and the feature points F2P3, F2P4, F2P5 and F2P6 of the object OBJ2 according to the image F2 captured by the camera unit 121. The communication unit 123 is configured to transmit the feature points F2P1, F2P2, F2P3, F2P4, F2P5 and F2P6 to the communication unit 113.

Figure 5B:
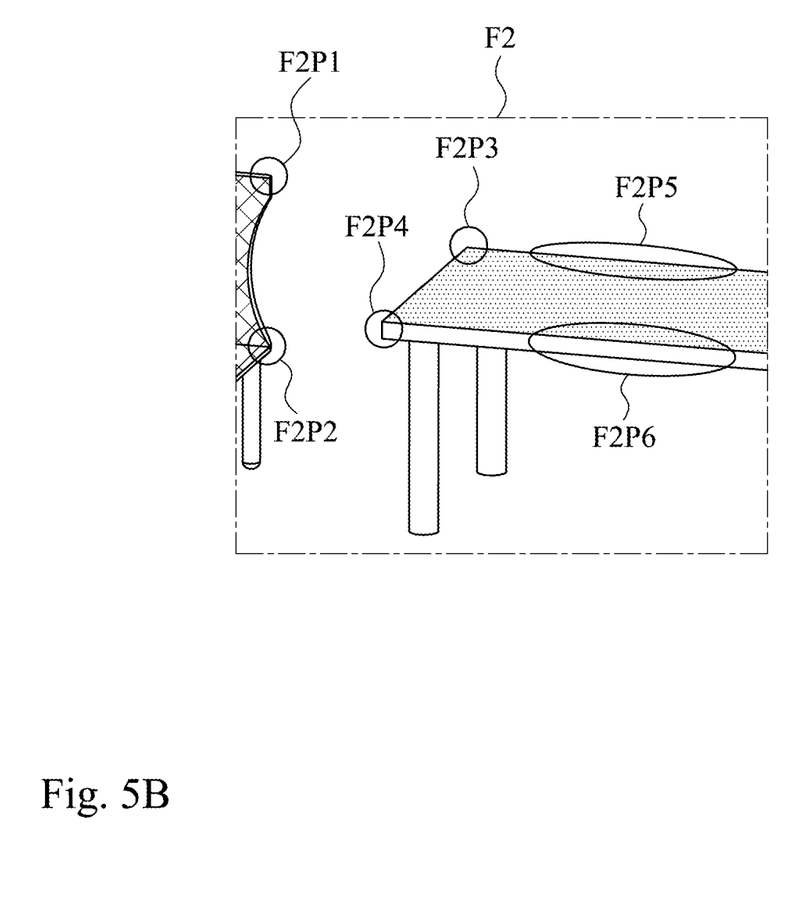
FIG. 5B is a schematic diagram illustrating the mapping relationship between the feature points and the map points.

Afterward, the tracking method 200 executes step S250 to receive the feature points of image F2 by the communication unit 113 and step S260 to estimate a pose (i.e. position and/or orientation) of the electronic device 120 according to the map and the feature points of image F2 by the processor 112. Reference is made to FIG. 5B, which is a schematic diagram illustrating the mapping relationship between the feature points and the map points. In one embodiment, when estimating the pose of the electronic device 120, the processor 112 first compare the received feature points F2P1, F2P2, F2P3, F2P4, F2P5, and F2P6 of the image F2 with the map points MP1, MP2, MP3, MP4, and MP5 in the map GM to determine if there is a match. Then, based on the comparison result, the processor 112 performs a tracking algorithm to estimate the pose of the electronic device 120. Here the tracking algorithm is any applicable tracking algorithm which tracks the pose of an object by using the matched map points similar as mentioned below. As shown in FIG. 5B, the descriptors of the feature points F2P1 and F2P2 are a net texture with green color and corner, the descriptors of the feature points F2P3 and F2P4 are a dot texture with brown and corner, the descriptors of the feature points F2P5 and F2P6 are a dot texture with brown and line. The feature point F2P1 and the map point MP1 have the similar descriptors (i.e. net texture and corner). Therefore, the processor 112 would determine that the feature point F2P1 matches the map point MP1. For similar reason, the processor 112 would determine that the feature point F2P2 matches the map point MP5, because there are similar descriptors.

In one embodiment, when the processor 112 matches the portion of the feature points F2P1 and F2P2 to the map points MP1 and MP5, the portion of the feature points F2P1 and F2P2 are added to the map points MP1 and MP5 for updating or refining the map. In general, the map GM will be updated continuously by the matching feature points extracted from the images captured by both the camera units 111 and 121.

In an embodiment, the map point MP1 includes two descriptors along with two timestamps. One of the descriptors is obtained along from the feature point F1P1 with a first timestamp (e.g., 2018041903040018) corresponding to the image F1. The other of the descriptors is obtained from the feature point F2P1 with a second timestamp (e.g., 2018041903040023) corresponding to the image F2. The first timestamp and the second timestamp are generated according to the time points when the images of F1P1 and F2P1 are captured, respectively. When there are more feature points from different images matching to the same map point, the descriptors of the map point in the map will be more precise and close to a current status of the physical environment. For example, the descriptor of the feature point F2P1 may contain different feature(s) or even more features than that of the feature point F1P1, which reflects different statuses of the corresponding map point at different timestamps.

In another embodiment, the map point MP1 includes a specific amount of descriptors (e.g., N descriptors) along with latest N timestamps. In this case, when there are more than N descriptors matching to the same map point, the latest descriptor will replace the oldest descriptor under the same map point.

Figure 5C:
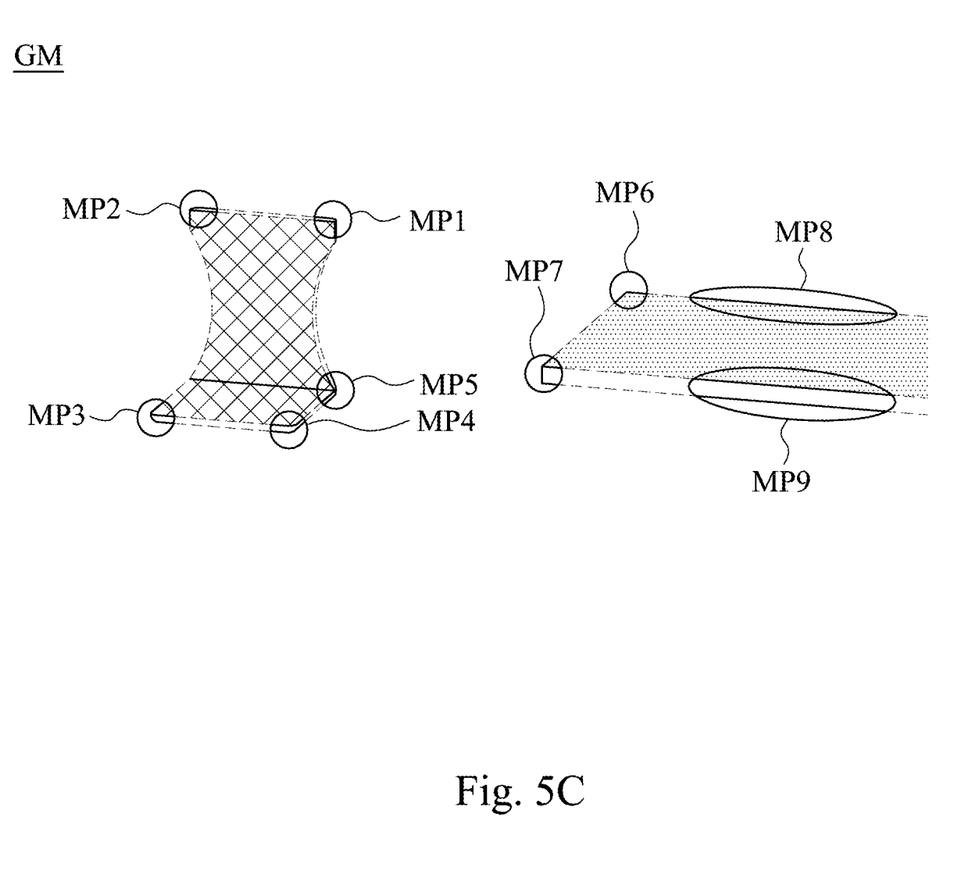
FIG. 5C is a schematic diagram illustrating the map points in the map.

In one embodiment, though the feature points F2P3, F2P4, F2P5 and F2P6 do not match to any map point, they can still be converted into the map points MP6, MP7, MP8, and MP9 as shown in FIG. 5C. The conversion method is similar to aforesaid embodiment shown in FIG. 4B. For example, if the camera unit 121 of the electronic device 120 comprises a depth camera, then the electronic device 120 can transmit to the electronic device 110 the feature points F2P3-F2P6 of the image F2 along with their depth information, which can be used to determine the distances between the feature points F2P3-F2P6 and the electronic device 120. Then the feature points F2P3-F2P6 can be converted into map points MP6-MP9 according to the determined distances, the 2D coordinates of the feature points F2P3-F2P6 and the corresponding pose of the electronic device 120 estimated in step S260. In another example, the feature points F2P3-F2P6 (including descriptors, 2D coordinates, timestamps, etc.) can be stored along with the corresponding pose of the electronic device 120 estimated in step S260 into the map GM, and wait to be converted into the map points MP6-MP9 later. More specifically, if later on the electronic device 110 obtains a feature point F4P1 in an image F4 (not shown in figures) matching one of the feature points (e.g. F2P3) and the corresponding pose of the electronic device 110 or 120 (depending on which device capturing the image F4), then the feature points F2P3 can be converted into the map point MP6 according to the feature points F2P3 and F4P1 and their corresponding poses. The conversion method is well known and will not be detailed here.

Figure 6A:
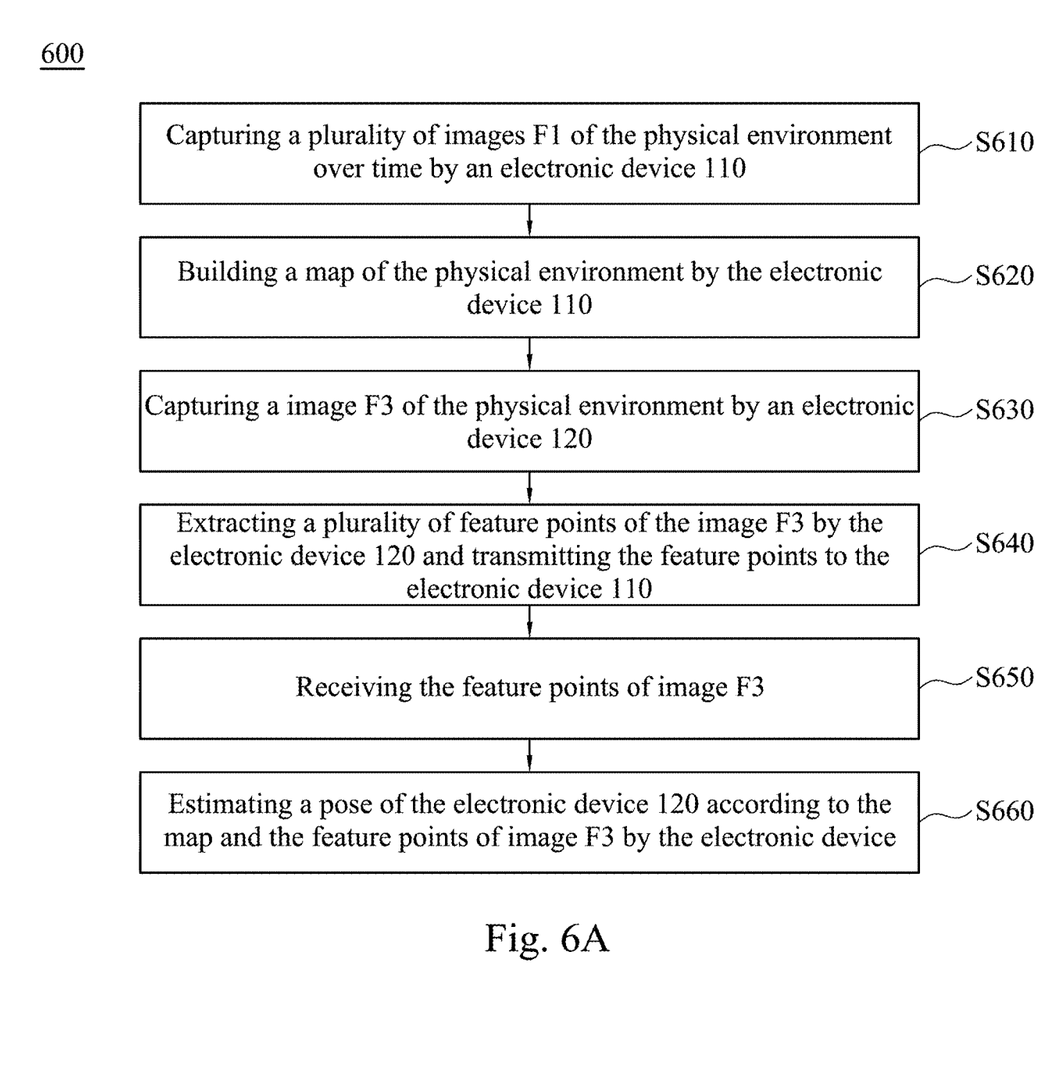
FIG. 6A is a flow diagram illustrating a tracking method according to an embodiment of this disclosure.
Figure 6B:
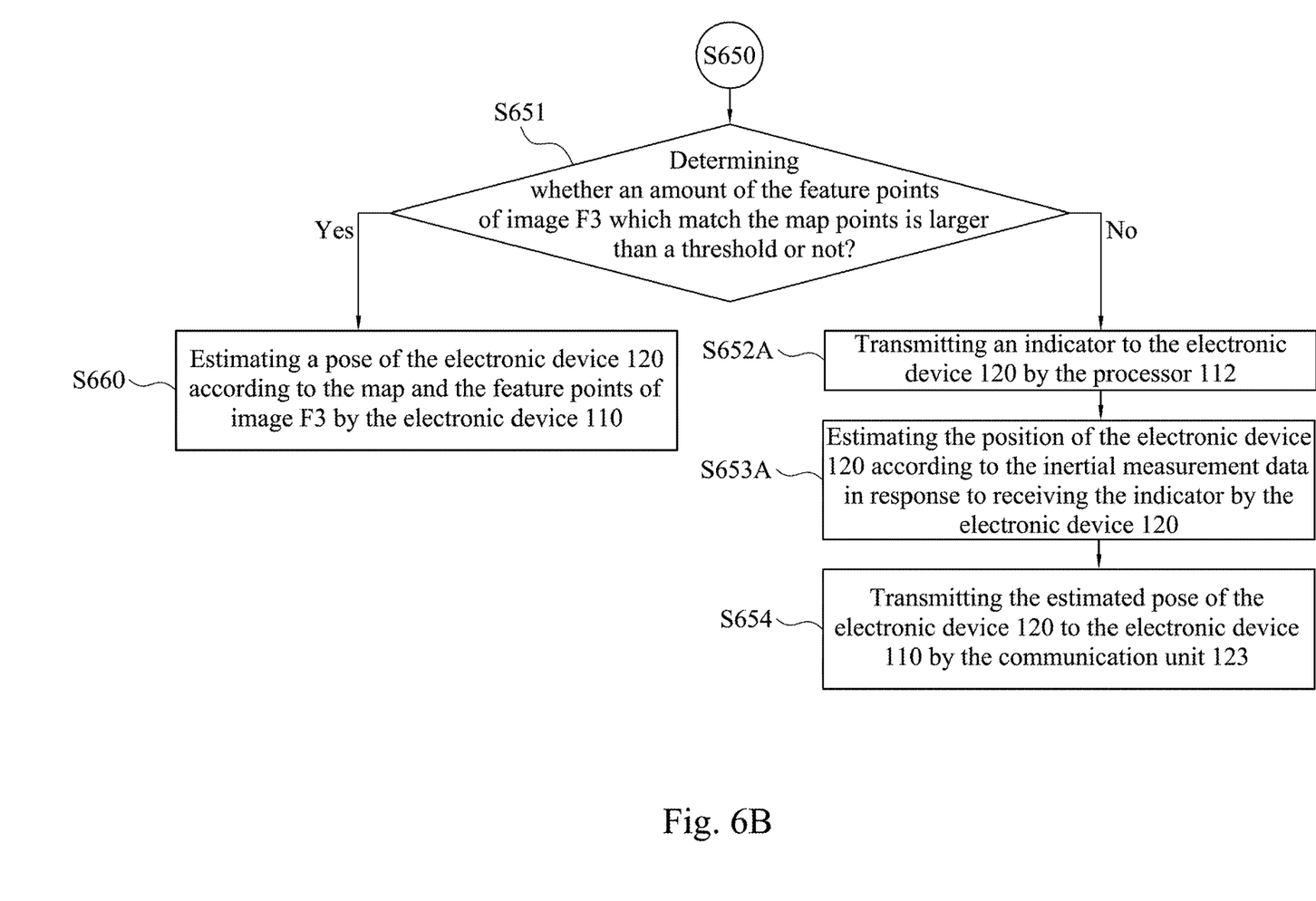
FIG. 6B is a partial flow diagram of the FIG. 6A according to another embodiment of this disclosure.
Figure 7A:
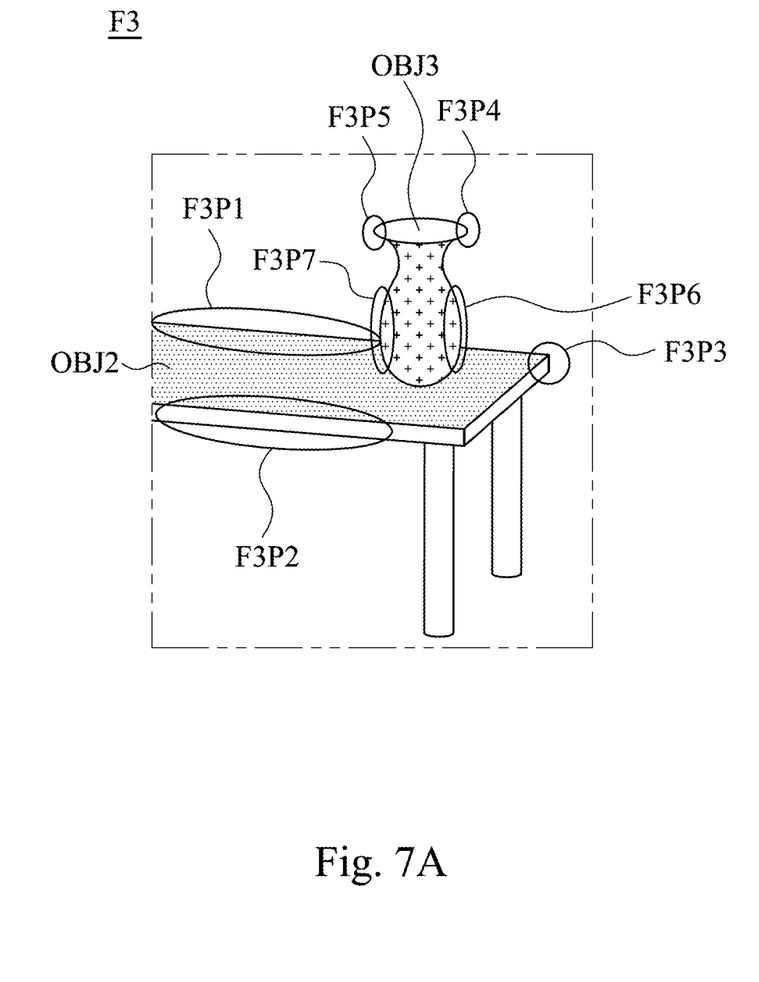
FIG. 7A is a schematic diagram illustrating the feature points of the images.
Figure 7B:
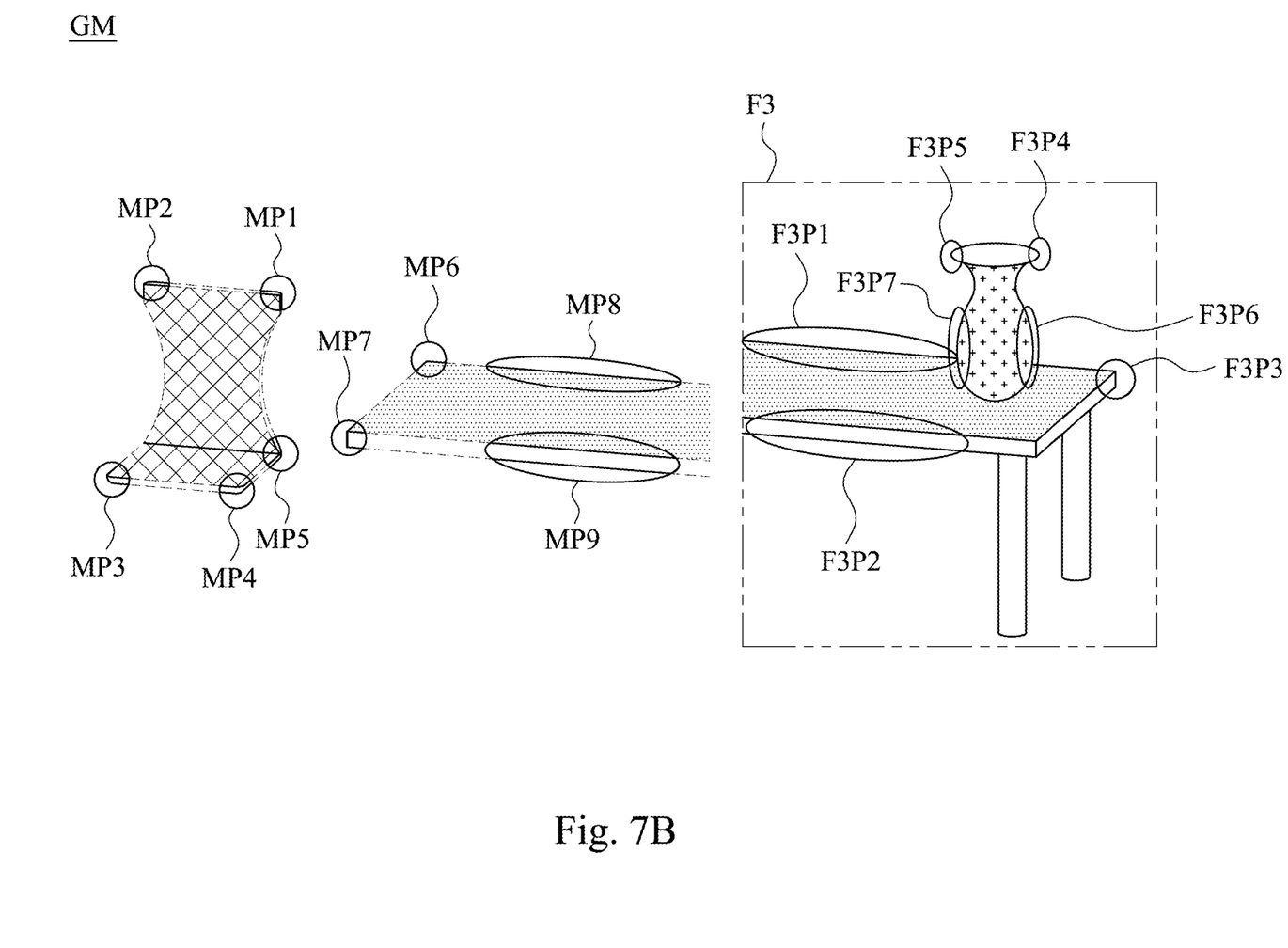
FIG. 7B is a schematic diagram illustrating the mapping relationship between the feature points and the map points.
Figure 7C:
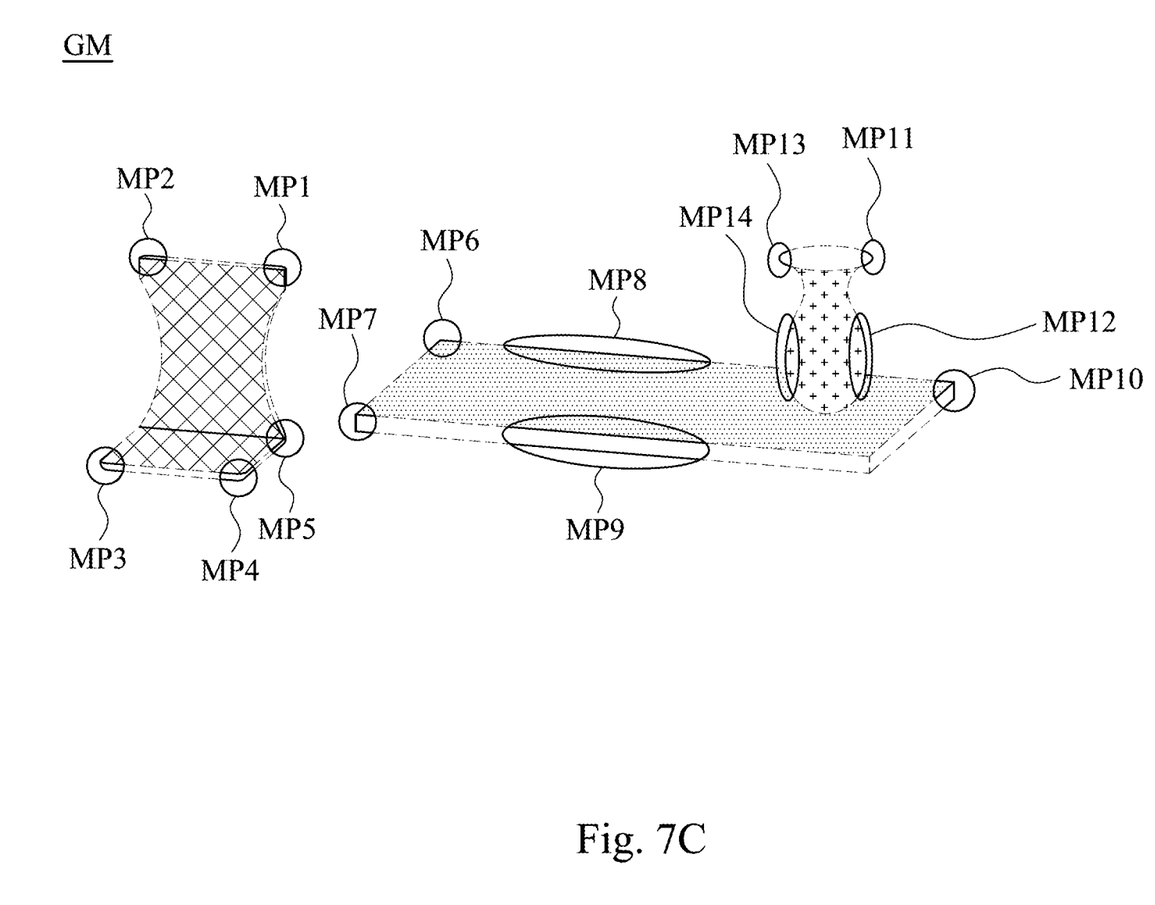
FIG. 7C is a schematic diagram illustrating the map points in the map.

Now reference is made to FIG. 6A to 6B. FIG. 6A is a flow diagram illustrating a tracking method according to an embodiment of this disclosure. FIG. 6B is a partial flow diagram of the FIG. 6A according to another embodiment of this disclosure. As shown in FIG. 6A, the steps S610 to S650 are similar to the steps S210 to S250. The difference is the image captured by the camera unit 121. Reference is made to FIG. 7A to 7C. FIG. 7A is a schematic diagram illustrating the feature points of the image F3. FIG. 7B is a schematic diagram illustrating the mapping relationship between the feature points and the map points. FIG. 7C is a schematic diagram illustrating the map points in the map GM.

When the camera unit 121 captures the image F3 and transmits to the processor 122, the processor 122 is configured to extract the feature points F3P1, F3P2 and F3P3 of the object OBJ2 and the feature points F3P4, F3P5, F3P6 and F3P7 of the object OBJ3 according to the image F3. The communication unit 123 is configured to transmit the feature points F3P1, F3P2, F3P3, F3P4, F3P5, F3P6 and F3P7 to the communication unit 113.

Based on aforesaid embodiment, the processor 112 is configured to determine whether the feature points F3P1, F3P2, F3P3, F3P4, F3P5, F3P6, and F3P7 match any of the map points MP1-MP9. As shown in FIG. 7B, the descriptors of the feature points F3P1 and F3P2 are a dot texture with brown color and line, the descriptors of the feature points F3P3 is a dot texture with brown color and corner, the descriptors of the feature points F3P4 and F3P5 are a plus (i.e. "+") texture with blue color and corner, and the descriptors of the feature points F3P6 and F3P7 are a plus texture with blue color and edge. Therefore, the feature point F3P1 is determined to be matching the map point MP8, and the feature point F3P2 is determined to be matching to the map point MP9.

The tracking method 600 further executes step S651 to determine whether an amount of the feature points of the image F3 which match the map points is larger than a threshold or not. In one embodiment, as shown in FIG. 7B, the when the processor 112 matches the feature points F3P1 and F3P2 to the map points MP8 and MP9, the portion of the feature points F3P1 and F3P2 are added to the map points MP8 and MP9 for refining the map (e.g. adding the new descriptor and timestamp about the map points MP8 and MP9). In step S651, the processor 112 calculates the amount of the feature points of the image F3 which match the map points. In FIG. 7B, the amount of the feature points F3P1 and F3P2 of the image F3 which match the map points is two (i.e. F3P1 and F3P2). If the threshold is one, i.e. smaller than the amount of the matching feature points, then the processor 112 further executes step S660 to estimate the pose of the electronic device 120 according to the matched map points (i.e. MP8 and MP9). The value of threshold depends on the tracking algorithm used, and this disclosure is not limited to any specific tracking algorithm. Thus, here the threshold of one is just an example and the scope of this disclosure should not be limited thereto.

Afterward, if the threshold (number of the feature points of image which match the map points) is four, the amount of the feature points of image F3 which match the map points is not larger than the threshold. Thus, the electronic device 110 further executes step S652A to transmit an indicator to the electronic device 120, which executes step S653A to estimate its own pose according to inertial measurement data in response to receiving the indicator from the electronic device 110. The indicator indicates a failure to estimate the pose of the electronic device 120, when the amount of the feature points of the image F3 which match the map points is not larger than the threshold. The indicator is used to tell the electronic device 120 to estimate its own pose by itself. Therefore, the processor 122 is configured to estimate the pose of the electronic device 120 according to the inertial measurement data. The inertial measurement data is generated by the IMU 124. The IMU 124 can provide further gesture or motion data of the electronic device 120, and the processor 122 can estimate the pose according to the data of the IMU 124. Thus, the electronic device 120 can still track its own pose even without the help of the more powerful electronic device 110.

Afterward, the tracking method 600 further executes step S654 to transmit the estimated pose of the electronic device 120 to the electronic device 110 by the communication unit 123. Thus, the electronic device 110 can still track the pose of the electronic device 120 when it fails to do the tracking by means of the feature points sent from the electronic device 120. The case of no enough matching feature points may occur when the quality of the image F3 is not good enough due to, for example, fast movement of the electronic device 120. Though there may be limited accuracy to estimate the pose only by means of the IMU data, it can prevent the electronic device 120 from losing tracking, especially when the problem of image quality is temporary.

In one embodiment, as shown in FIG. 7B, though the feature points F3P3, F3P4, F3P5, F3P6 and F3P7 fail in matching any of the map points MP1-MP9, they can still be converted into the map points MP10, MP11, MP12, MP13, and MP14 as shown in FIG. 7C. The conversion method is similar to aforesaid embodiment shown in FIG. 4B. For example, if the camera unit 121 of the electronic device 120 comprises a depth camera, then the electronic device 120 can transmit to the electronic device 110 the feature points F3P3-F3P7 of the image F3 along with their depth information, which can be used to determine the distances between the feature points F3P3-F3P7 and the electronic device 120. Then the feature points F3P3-F3P7 can be converted into map points MP10-MP14 according to the determined distances, the 2D coordinates of the feature points F3P3-F3P7 and the corresponding pose of the electronic device 120 estimated in step S660 or received from the electronic device 120 in step S654. In another example, the feature points F3P3-F3P7 (including descriptors, 2D coordinates, timestamps, etc.) can be stored into the map GM along with the corresponding pose of the electronic device 120 estimated in step S660 or received from the electronic device 120 in step S654, and wait to be converted into the map points MP10-MP14 later. More specifically, if later on the electronic device 110 obtains a feature point F5P1 in an image F5 (not shown in figures) matching one of the feature points (e.g. F3P3) and the corresponding pose of the electronic device 110 or 120 (depending on which device capturing the image F5), then the feature points F3P3 can be converted into the map point MP10 according to the feature points F3P3 and F5P1 and their corresponding poses. The conversion method is well known and will not be detailed here.

In some embodiments, in the tracking methods 200 and 600, the electronic device 120 does not extract the feature points from the images F2 and F3 and transmit the extracted feature points to the electronic device 110. Instead, the electronic device 120 transmits the full or compressed images of F2 and F3 to the electronic device 110, which then extracts the feature points from the received full or compressed images. The other steps in the tracking methods 200 and 600 remain the same.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tracking system, comprising:
a first electronic device located in a physical environment, the first electronic device comprising:
a first camera unit configured for capturing a plurality of first images of the physical environment;
a first processor, coupled to the first camera unit and configured for extracting a plurality of first feature points from the first images, generating a plurality of map points according to the extracted first feature points, and building a map of the physical environment according to the map points; and a first communication circuit coupled to the first processor; and
a second electronic device located in the physical environment, the second electronic device comprising:
a second camera unit configured for capturing a second image of the physical environment;
a second processor coupled to the second camera unit and configured for extracting a plurality of second feature points from the second image; and
a second communication circuit coupled to the second processor and configured for transmitting the second feature points to the first electronic device;
wherein the first communication circuit is configured for receiving the second feature points, and the first processor is further configured for estimating a pose of the second electronic device according to the map and the received second feature points;
wherein the pose of the second electronic device comprises at least one of a position of the second electronic device and an orientation of the second electronic device;
wherein the first processor estimates the pose of the second electronic device when an amount of the second feature points which match the map points is larger than a threshold.

2. The tracking system of claim 1, wherein the first communication circuit transmits the estimated pose of the second electronic device to the second electronic device.

3. The tracking system of claim 1, wherein the first processor estimates the pose of the second electronic device according to the map points which are matched to the second feature points.

4. The tracking system of claim 1, wherein each of the map points comprises a first descriptor which indicates at least one feature of the corresponding map point, and each of the second feature points comprises a second descriptor which indicates at least one feature of the corresponding second feature point, wherein the first processor determine whether there is a match between the second feature point and the map point according to the first and second descriptors.

5. The tracking system of claim 4, wherein the second feature point further comprises a timestamp corresponding to the second descriptor, and the first processor updates the map by adding to a first map point of the map points the descriptor and the timestamp of the second feature point which matches the first map point.

6. The tracking system of claim 1, wherein the first electronic device transmits to the second electronic device an indicator indicating a failure to estimate the pose of the second electronic device, when an amount of the second feature points which match the map points is not larger than a threshold.

7. The tracking system of claim 6, wherein the second electronic device further comprises an inertial measurement unit (IMU) for generating inertial measurement data, and the second processor is configured for estimating the pose of the second electronic device according to the inertial measurement data in response to receiving the indicator.

8. The tracking system of claim 7, wherein the second electronic device transmits the estimated position of the second electronic device to the first electronic device.

9. The tracking system of claim 8, wherein the first processor updates the map by adding the received estimated pose of the second electronic device and the second feature point does not which match any of the map points to the map.

10. A tracking method, comprising:
capturing a plurality of first images of a physical environment by a first electronic device;
extracting a plurality of first feature points from the first images, generating a plurality of map points according to the extracted first feature points, and building a map of the physical environment according to the map points by the first electronic device;
capturing a second image of the physical environment by a second electronic device;
extracting a plurality of second feature points from the second image and transmitting the second feature points to the first electronic device by the second electronic device;
receiving the second feature points; and
when an amount of the second feature points which match the map pints is larger than a threshold, estimating a pose of the second electronic device according to the map and the received second feature points by the first electronic device;

wherein the pose of the second electronic device comprises at least one of a position of the second electronic device and an orientation of the second electronic device.

11. The tracking method of claim 10, further comprising: transmitting the estimated pose of the second electronic device to the second electronic device by the first electronic device.

12. The tracking method of claim 10, wherein the pose of the second electronic device is estimated according to the map points which are matched to the second feature points.

13. The tracking method of claim 10, further comprising: transmitting an indicator to the second electronic device by the first electronic device when an amount of the second feature points which match the map points is not larger than a threshold;

wherein the indicator indicates a failure to estimate the pose of the second electronic device.

14. The tracking method of claim 13, wherein the second electronic device further comprises an inertial measurement unit (IMU) is configured for generating inertial measurement data, wherein the method further comprise:

estimating the pose of the second electronic device according to the inertial measurement data in response to receiving the indicator by the second electronic device.

15. The tracking method of claim 14, further comprising: transmitting the estimated pose of the second electronic device to the first electronic device by the second electronic device.

16. A tracking system, comprising:
a first electronic device located in a physical environment, the first electronic device comprising:
a first camera unit configured for capturing a plurality of first images of the physical environment;
a first processor, coupled to the first camera unit and configured for extracting a plurality of first feature points from the first images, generating a plurality of map points according to the extracted first feature points, and building a map of the physical environment according to the map points; and
a first communication circuit coupled to the first processor; and
a second electronic device located in the physical environment, the second electronic device comprising:
a second camera unit configured for capturing a second image of the physical environment;
a second processor coupled to the second camera unit and configured for extracting a plurality of second feature points from the second image; and
a second communication circuit coupled to the second processor and configured for transmitting the second feature points to the first electronic device;
wherein the first communication circuit is configured for receiving the second feature points and the first processor is further configured for comparing the second feature points with the map points so as to determine whether there is a match there between and updating the map according to the comparison result;
wherein each of the map points comprises a first descriptor which indicates at least one feature of the corresponding map point, and each of the second feature points comprises a second descriptor which indicates at least one feature of the corresponding second feature point, wherein the first processor determine whether there is a match between the second feature point and the map point according to the first and second descriptors.

17. The tracking system of claim 16, wherein the second feature point further comprises a timestamp corresponding to the second descriptor, and the first processor updates the map by adding to a first map point of the map points the descriptor and the timestamp of the second feature point which matches the first map point.

18. The tracking system of claim 16, wherein the first processor estimates a pose of the second electronic device according to the map points which are matched to the second feature points, and updates the map by adding to the map the estimated pose of the second electronic device and the second feature point which does not match any of the map points.

* * * * *